(12) United States Patent
Gutowski (10) Patent No.: US 6,424,643 B1
(45) Date of Patent: Jul. 23, 2002

(54) METHOD OF MODELING A CDMA CELLULAR TELEPHONE SYSTEM

(75) Inventor: Stanley Gutowski, Herndon, VA (US)

(73) Assignee: ScoreBoard, Inc., Herndon, VA (US)

( * ) Notice: Subject to any disclaimer, the term of this patent is extended or adjusted under 35 U.S.C. 154(b) by 0 days.

(21) Appl. No.: 09/263,572

(22) Filed: Mar. 8, 1999

(51) Int. Cl.[7] .............................................. H04B 7/208
(52) U.S. Cl. ...................... 370/342; 370/335; 370/344; 455/63; 455/67
(58) Field of Search ................................ 370/342, 341, 370/340, 335, 329, 327, 320, 344, 337, 201, 479; 455/62, 63, 69, 422, 425, 450, 452, 455, 522

(56) References Cited

U.S. PATENT DOCUMENTS

| 5,265,119 A | * 11/1993 | Gilhousen et al. | 370/335 |
| 5,832,368 A | * 11/1998 | Nakano et al. | 455/63 |
| 5,835,847 A | * 11/1998 | Gilmore et al. | 455/12.1 |
| 5,878,328 A | 3/1999 | Valenzuela et al. | |
| 5,926,762 A | 7/1999 | Jensen et al. | |
| 5,933,787 A | * 8/1999 | Gilhousen et al. | 455/562 |
| 5,987,326 A | * 11/1999 | Tiedemann, Jr. et al. | 455/442 |
| 6,023,463 A | * 2/2000 | Wiedemann et al. | 370/344 |
| 6,067,446 A | * 5/2000 | Persson et al. | 455/69 |

FOREIGN PATENT DOCUMENTS

EP          0 986 276 A       8/1998

* cited by examiner

Primary Examiner—Huy D. Vu
Assistant Examiner—M. Phan
(74) Attorney, Agent, or Firm—Joseph J. Zito; Kendal M. Sheets; ZITO tlp (57) ABSTRACT

A computer implemented process which utilizes actual received signal level data gathered from closely spaced locations covering an entire CDMA system to calculate interference levels at each location, determines those base stations which most probably communicate with a mobile unit at each particular location, compiles a list of neighbor base stations for each base station at each location throughout the system, and determines the transmit power necessary for each base station to communicate with a mobile unit at each location, calculates interference levels at each base station, and determines the transmit power necessary for a mobile unit at each location to communicate with each base station which most probably communicates with a mobile unit at that particular location.

2 Claims, 6 Drawing Sheets

| Pilot | Ec/Io | p(X) | pn(X) |
|---|---|---|---|
| A | -8 | 0.95 | 0.95 |
| B | -10 | 0.92 | 0.92 |
| C | -13 | 0.60 | 0.58 |
| D | -15 | 0.21 | 0.12 |

| P(X) | CD | C' D | CD' | C' D' |
|---|---|---|---|---|
| AB | 0.000 | 0.089 | 0.505 | 0.276 |
| A' B | 0.007 | 0/004 | 0.022 | 0.015 |
| AB' | 0.012 | 0.006 | 0.036 | 0.024 |
| A' B' | 0.001 | 0.000 | 0.002 | 0.001 |

METHOD OF MODELING A CDMA CELLULAR TELEPHONE SYSTEM

BACKGROUND OF THE INVENTION

1. Field of the Invention

This invention relates to cellular telephone systems and, more particularly, to processes for modeling code division multiple access (CDMA) cellular telephone systems.

2. History of the Prior Art

Presently available commercial mobile communication systems typically include a plurality of fixed base stations (cells) each of which transmits signals to and receives signals from mobile units within its communication area. Each base station in a CDMA system communicates with mobile units by sending digital transmissions over the same frequency spectrum. In most cellular systems, especially those with cells in urban areas carrying heavy traffic, each base station may be further divided into two or three sectors each of which may include its own transmission equipment the antennas of which provide 180 or 120 degree coverage, respectively. When the term base station is used herein, both sectors and cells are intended unless the context indicates otherwise.

A CDMA system transmits messages digitally. All transmissions in a CDMA system are on the same frequency spectrum so the digital signals constituting each message must somehow be recognizable from all of the possible transmissions available. To accomplish this, the digital messages are encoded by a series of overlaid digital codes. One of these codes, called a pseudorandom noise (PN) code, is applied to all transmissions throughout a CDMA system. The PN code is used to encode the individual bits of the original message at the transmitter and to decode the encoded message at the receiver. In order to recognize messages from a particular base station, each base station uses a distinct time offset (called a PN offset) from some repeating initial time to begin encoding the transmission using the PN code. Thus, one base station may begin an encoded transmission at the initial time, a second base station at an offset of one unit from the initial time, a third at an offset of two units from the initial time, and so on up to a total of 512 offsets.

Each transmission between a mobile unit and a base station is also placed on what is effectively a separate channel by further encoding the transmission with one of a plurality of Walsh codes. A message encoded using a Walsh code, as with a PN code, can only be decoded by the same Walsh code at the receiver. Thus, an encoded transmission on a particular channel is decoded by applying a mask including both the Walsh and PN codes to the received pattern of information bits commencing at the PN offset designated for the particular base station.

A base station normally has sixty-four Walsh codes available for defining channels on which it can establish transmissions with mobile units. Certain of these channels are preassigned to function as control channels. For example, in order to advise mobile units of the particular PN offset used, each base station continuously broadcasts the PN code using its assigned PN offset on one of these channels (a pilot channel) defined by Walsh codes. Mobile units monitor this preassigned pilot channel. When a mobile unit finds an offset at which a pilot is decodable, it refers to another control channel (a synchronization channel) to determine the initial time and thereby identify the PN offset of the base station. Each system also maintains a paging channel upon which indications are posted that new messages are arriving. A total of nine channels are provided for these and other control functions.

In order to allow mobile units to transmit and receive telephone communications as the units travel over a wide geographic area, each base station is normally physically positioned so that its area of coverage is adjacent to and overlaps the areas of coverage of a number of other base stations. When a mobile unit moves from an area covered by one base station to an area covered by another base station, communication with the mobile unit is transferred (handed off) from one base station to another base station in an area where the coverage from different base stations overlaps.

In most other types of cellular communication systems, a mobile unit communicates with only one base station at a time. However, since all transmissions in a CDMA system take place on the same frequency spectrum, a mobile unit actually has available all of the information which is within its range. However, it only decodes information on PN offsets and Walsh code channels which are directed to it. A CDMA mobile unit uses a receiver which is able to apply a number of decoding masks simultaneously at different offsets of the entire spectrum of information which it receives. At present, a mobile receiver may decode as many as six PN offsets at once. However, usually only three PN offsets are used to decode messages while the others decode control information. Because a mobile unit in a CDMA system may be receiving the same information from a number of different base stations at the same instant, it may decode information from a single message sent to it from a number of different base stations simultaneously using different PN offsets and Walsh codes and combine that information to produce a single output message. Thus, while a signal transmitted from one base station may be fading, the same message may be being received with adequate strength from another base station. This allows a CDMA system to offer the possibility of significantly better transmission. The situation in which a mobile is communicating with a number of base stations at once is called "soft handoff."

In order for a system operator to allocate resources to a cellular telephone system intelligently, the operator typically models the system. In order to utilize the advantages offered by CDMA technology, an operator should be able to model the system accurately. However, because a CDMA system can involve a plurality of base stations each communicating with the same mobile unit simultaneously, much more data must be dealt with and more resources have been required than are available to accurately model such a system. This has led to the use of probability techniques (typically Monte Carlo techniques) which utilize only a small number of locations throughout the system and extrapolate between those locations. This has produced less than accurate results leading to incorrect allocation of assets.

It is desirable to provide a new process by which the properties of a CDMA cellular system may be modeled accurately so that steps may be taken to improve the system.

SUMMARY OF THE INVENTION

The present invention is realized by a computer implemented process which utilizes actual received signal level data gathered from closely spaced locations covering an entire CDMA system to calculate interference levels at each location, determines those base stations which most probably communicate with a mobile unit at each particular location, compiles a list of neighbor base stations for each base station at each location throughout the system, and determines the transmit power necessary for each base station to communicate with a mobile unit at each location, calculates interference levels at each base station, and determines the transmit power necessary for a mobile unit at each location to communicate with each base station which most probably communicates with a mobile unit at that particular location.

These and other features of the invention will be better understood by reference to the detailed description which follows taken together with the drawings in which like elements are referred to by like designations throughout the several views.

DETAILED DESCRIPTION

Figure 1:
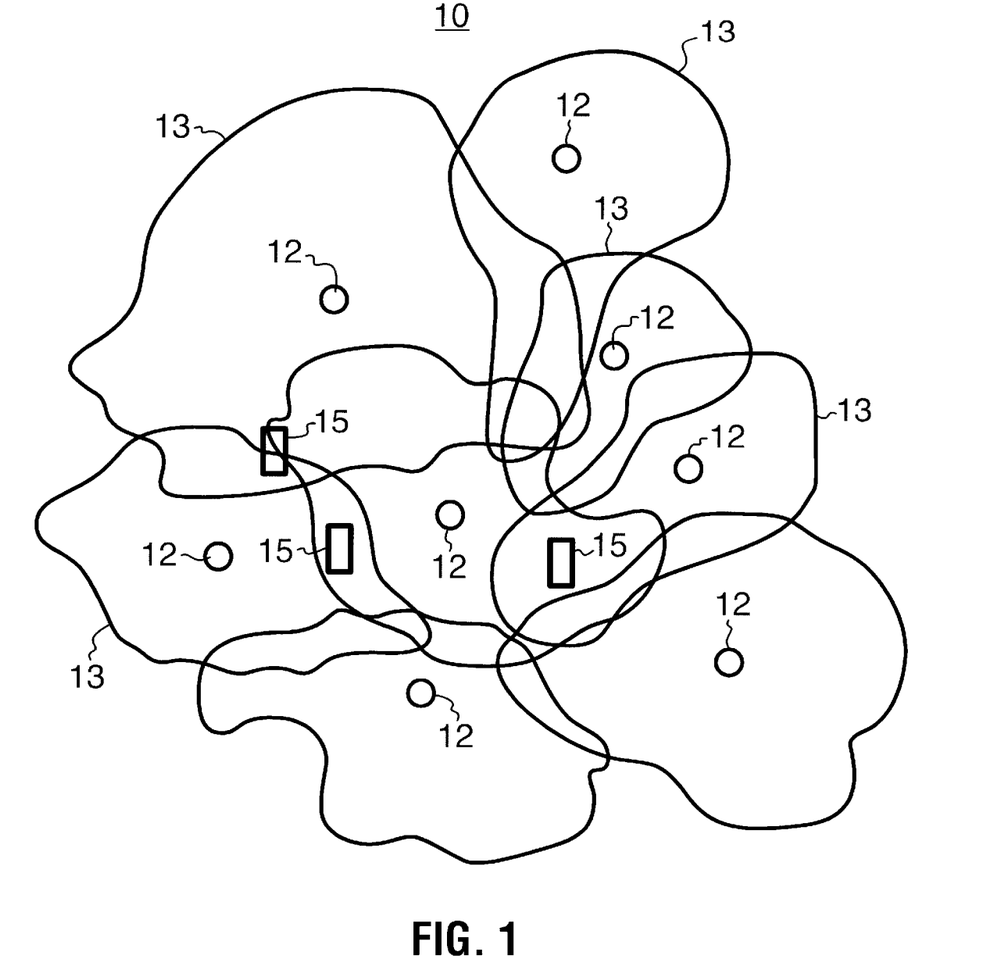
FIG. 1 is a diagram of a portion of a CDMA cellular telephone system.

Referring now to FIG. 1, there is illustrated a portion of a CDMA cellular telephone system 10 which includes a number of individual base stations 12 arranged to provide coverage of a service area. Each base station 12 in FIG. 1 is illustrated having an outer boundary 13 which indicates the effective limit of its communication range. The boundaries 13 of different adjacent base stations typically overlap.

Each of the base stations 12 includes at least one cell which transmits and receives communications with mobile units 15 operating within its service area. In many cases, instead of a single cell, a base station is divided into two or three sectors each of which includes equipment for communicating with a number of mobile units in an area defined partially by an antenna pattern angle of 180° or 120°, respectively, from the base station. All transmissions between a base station and mobile units in a CDMA system are digital and are carried on the same "spread spectrum" frequency band of 1.25 MHz. The digital information bits of each message are expanded using various levels of coding information. One such level is called a pseudorandom noise (PN) code. Each base station throughout a system uses the same PN code to encode the information transmitted. Each base station identifies itself by using a distinct time offset (generally referred to as a PN offset) from some repeating initial time for applying the PN code to any transmission. The intervals between initial times are divided into a total of 512 units. Thus, one base station may begin an encoded transmission at the initial time, a second base station at an offset of one unit from the initial time, a third at an offset of two units, and so on. Typically, base stations physically near one another utilize PN offsets which are widely separated from one another. The initial time and the various offsets are typically established accurately using circuitry such as global positioning system (GPS) circuitry.

Since each base station transmits all of its messages using the same PN code at the same PN offset, there must be some way for a mobile unit to detect messages intended for it. To accomplish this, each transmission with a base station is placed on what is effectively a separate channel by further encoding the transmission with one of a plurality of Walsh codes. A message encoded by a Walsh code, like a PN code, is sent and received using a mask of the same pattern so that messages sent using other Walsh codes are orthogonal to the encoding and are canceled out. A transmission on a particular channel is decoded by applying a mask including the Walsh and PN codes to the received pattern of information bits commencing at the PN offset designated for the particular channel.

Figure 3:
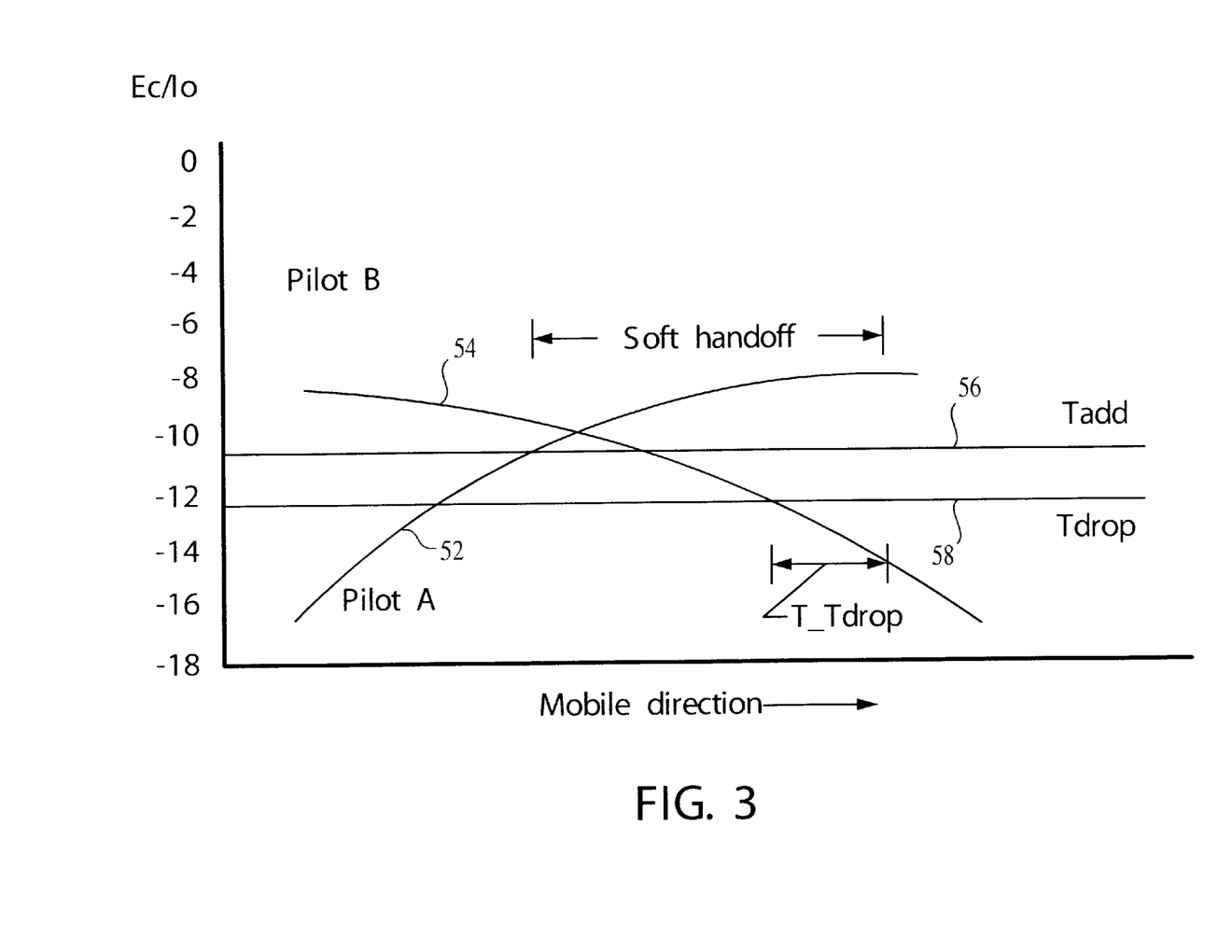
FIG. 3 is a diagram illustrating the handoff criteria of a CDMA system.

The CDMA system of transmission offers a number of advantages. One of these advantages is that a mobile unit may be receiving the same message relayed through a number of different base stations at the same time. Since all transmissions take place on the same frequency band, a mobile unit actually receives all of the information which is available within its range but only decodes information on channels which are directed to it. A CDMA mobile unit uses a receiver which is able to apply a number of different Walsh and PN decoding masks at the same instant to the entire spectrum of information which it receives. By knowing the channels which it desires to receive, a mobile unit may decode information from a single message sent to it by a number of different base stations simultaneously and combine that information to produce a single output message. This is illustrated in the graph in FIG. 3 that demonstrates reception and handoff criteria for a mobile unit receiving two pilot signals, Pilot A 52 and Pilot B 54 from two separate base stations. The x-axis graphs declining interference levels and the y-axis graphs movement of the mobile unit through a CDMA system. Curves 52, 54 show movement of the mobile unit towards a base station transmitting Pilot A 52 and away from a base station transmitting Pilot B 54. Therefore, the Pilot A signal 52 is gaining transmission strength to the mobile unit while contemporaneously experiencing declining interference and Pilot B 54 is fading while contemporaneously experiencing rising interference. The lines 56, 58 designating the span between negative ten dB and negative twelve dB define the area where a mobile unit is receiving both Pilot A 52 and Pilot B 54 signals with sufficient transmission power and lack of interference that the mobile unit is served by both base stations that are transmitting Pilot A 52 and Pilot B 54. Below negative twelve dB, the signal for Pilot B 54 is dropped from the mobile unit and the soft handoff to Pilot A 52 is complete. Thus, while a message from one base station may be fading, the same message may be received with adequate strength from another base station. This allows CDMA systems to offer the possibility of significantly better transmission than other systems.

Even with their advantages, CDMA systems do have problems. One of these is caused by the fact that all transmissions occur on the same frequency spectrum. Since all transmissions take place on the same frequency band, a mobile unit actually receives all of the transmissions which are available within its range. Those transmissions which are not directed to the particular receiver act as interference which tends to obscure the desired transmissions. When the level of transmissions (desired and not desired) at the receiver reaches a level (before decoding) greater than approximately 14 dB more than the level of desired signals, it becomes difficult to decode the desired transmissions. This level of signal before decoding translates to approximately 7 dB greater than the interference level after a message directed to a receiver has been decoded.

In order to provide high quality transmissions, CDMA systems include features for automatically increasing and decreasing power levels at the base stations and mobile units in order to maintain the message strength after decoding at a level typically just greater than approximately 7 dB above the level of all interference on the channel.

A mobile unit determines whether the signals received are strong enough by measuring the rate at which errors occur in the decoded signals received (the frame error rate), a factor directly related to the signal-to-interference ratio. When errors rise above a prescribed limit, a mobile unit signals the base station to increase the strength of its signal. The base station does this, but then incrementally decreases the signal strength from the higher transmission level until the mobile unit again signals to raise the strength. Thus, when the signal falls to a level where the frame error rate becomes too high, indicating a strength below approximately 7 dB greater than the interference level after decoding, the base station automatically increases the power of the signal being transmitted thereby raising the received signal level with respect to interference and increasing the signal quality.

In a similar manner, a base station measures the strength of signals received from a mobile unit by monitoring frame error rate and indicates to the mobile unit whether to raise or lower the strength of its transmission. When a mobile unit is in contact with a number of base stations, the mobile unit receives signals from each of the base stations indicating whether to raise or lower its transmission strength with respect to that base station. As long as there is one base station signaling the mobile unit to lower its transmission strength, the mobile unit ignores any signal to increase and responds instead to the signal to lower the strength of its transmission because a single strong signal is sufficient to provide interference-free service for the mobile.

It is very useful to be able to evaluate the quality of service in a CDMA service area in order to enhance the operation of the system. To do so with any precision requires that data regarding the actual levels of signals transmitted from and received by each base station and any mobile unit at any location throughout the system be ascertainable so that received signal levels can be compared to interference levels to determine whether transmit power levels are available to provide quality signals throughout the system.

All prior art methods of evaluating a CDMA system to determine whether system characteristics are such that transmit power levels are available to provide quality signals throughout the system have utilized propagation models to estimate values of data at locations throughout the system from real data taken at only at few points in the system. Using this derived data, these prior art methods evaluate transmitted and received power for a limited number of random locations, store the data for these locations, and then move on to evaluate transmitted and received power for a second limited number of random locations. This continues until a sufficient number of locations have been evaluated using estimated values to provide a view of the entire system. The prior art has found this necessary because of the very large amount of data and the number of manipulations necessary to realize useful results from real data for even a small number of locations made the use of substantially greater numbers of locations seem impossible. Because data from so few locations are used, it is very difficult to understand the actual system. The result is an inability to determine accurately how long the model should be run and how many random points should be selected. Consequently, it is not accurately known whether difficulties with the system are caused by the system arrangement or by errors in the modeling. The effect has been that none of the prior art determinations allows an accurate determination of system characteristics sufficient to make reasoned judgments of the effects which will be produced by different variations to the system characteristics.

The present invention provides a process for evaluating much more accurately the characteristics of a CDMA system so that an operator may take steps to enhance the quality of service provided.

Figure 6:
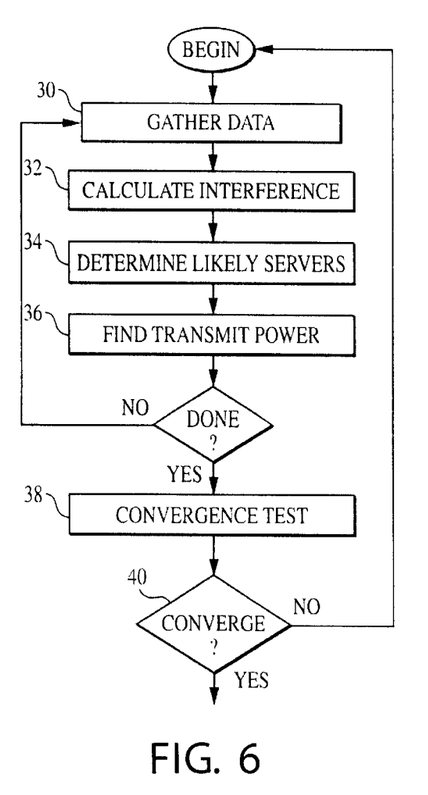
FIG. 6 illustrates a process in accordance with the present invention.
Figure 7:
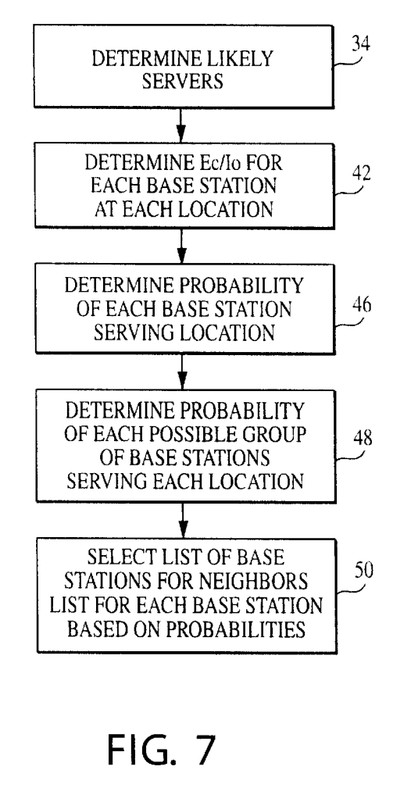
FIG. 7 illustrates in more detail a portion of the process of FIG. 6.

In order to evaluate any system, data relating to that system is first gathered 30 (see FIG. 6). This may be the same data gathered for use in an AMPS or TDMA system utilized in the same area as a the CDMA system so long as that data is gathered from closely separated locations throughout the system. In one embodiment, data is gathered at locations separated by approximately one hundred feet. On the other hand, the data may be accumulated specifically for determining the quality of CDMA service in the service area. In any case, the specific data utilized is data indicating transmitted signal strength of a transmission at a base station, received signal strength of the transmission at a location, and the location of receipt, recorded for closely positioned locations throughout the system.

Figure 2:
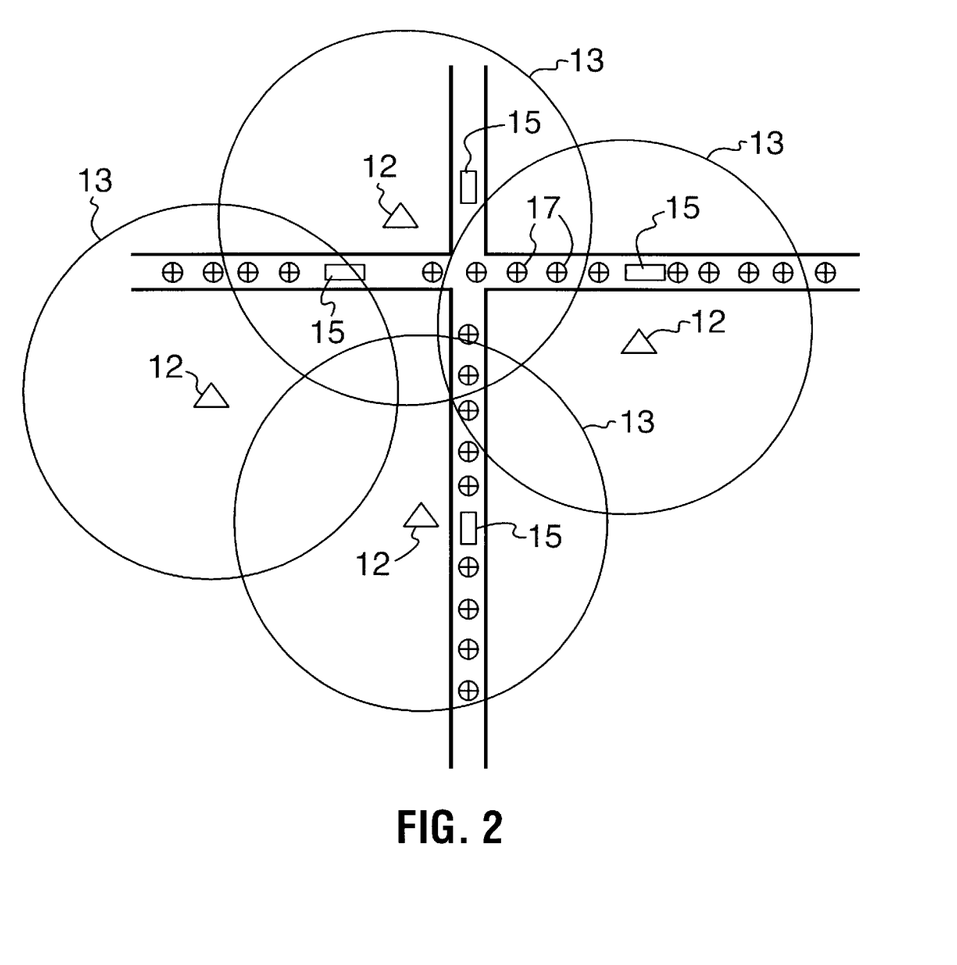
FIG. 2 is an illustration of drive testing for gathering data in a CDMA telephone system.
Figure 8:
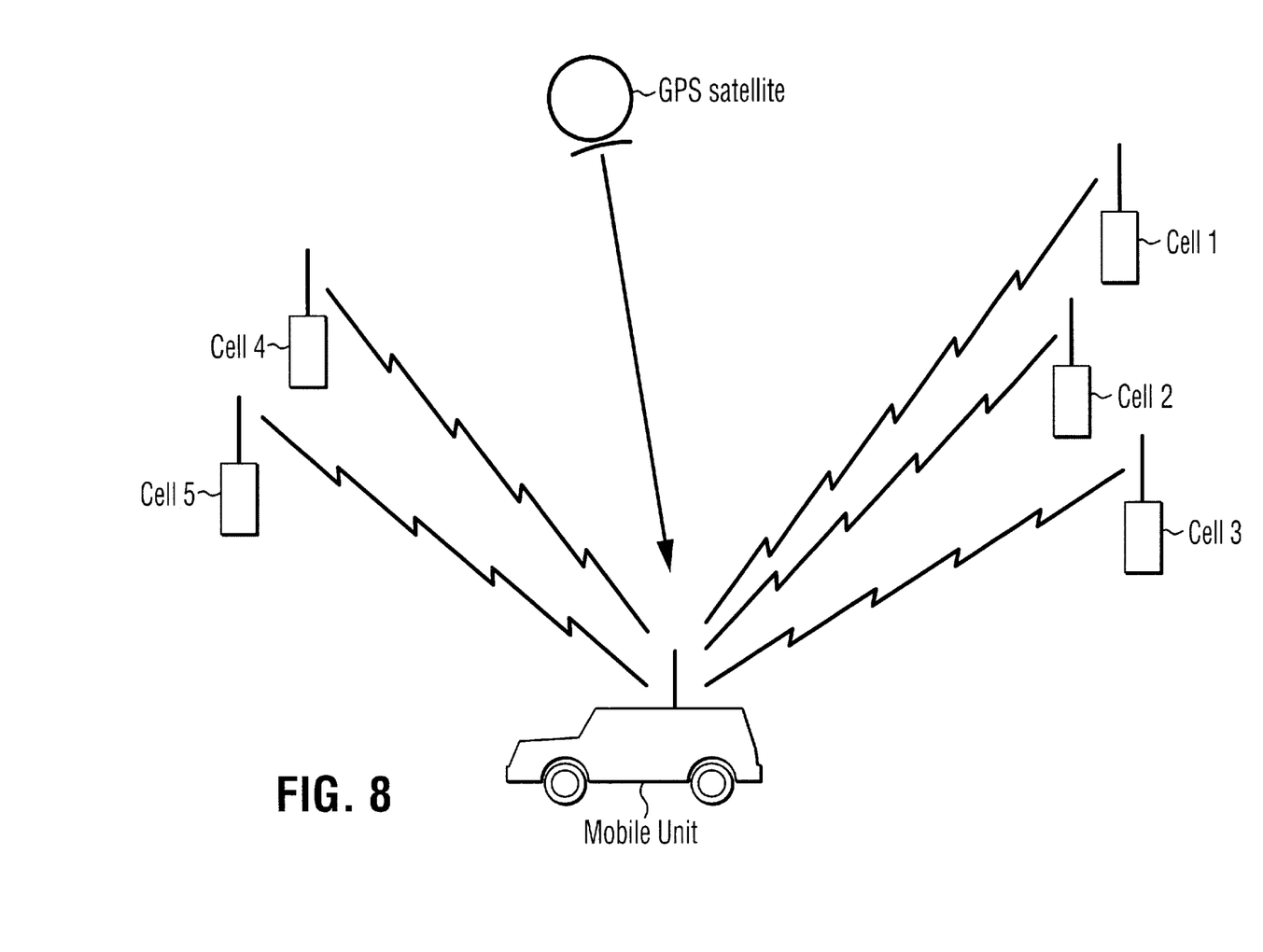
FIG. 8 illustrates a mobile unit equipped for gathering data to be used in carrying out the process of the invention.

FIG. 2 illustrates drive test vehicles 15 gathering data specifically for a CDMA system. Drive tests are conducted using a special receiver called a PN scanning receiver which is capable of receiving signals at a level typically as great as 21 dB below the total received signal strength. A PN scanning receiver is associated with a global positioning system (GPS) receiver and a computer within a test vehicle 15. The test vehicle 15 drives the roads of the system 10 as the PN scanning receiver automatically produces measurements at regular intervals (typically every one to five seconds). At each measurement interval 17, the receiver measures the total signal strength of all signals received and the strength of each pilot signal received from any base station 12. FIG. 8 illustrates a mobile unit equipped for such data gathering. These values are stored by a computer usually in the test vehicle together with time and position values furnished by the GPS receiver.

Once the data has been gathered describing the system, this data is used to provide the evaluation. It should be noted that in contrast to prior art system evaluation methods, the present invention utilizes actual data gathered at closely spaced locations throughout the system thereby eliminating the need to estimate results between widely separated locations at which actual measurements are taken. FIG. 6 illustrates the steps of the process of the present invention and should be referred to during the following discussion.

The pilot signals generated by all base stations on the pilot channel are transmitted at a constant power throughout the system. This allows a mobile unit to compare the strength of the pilot signals generated by different base stations against one another. The known transmission level also allows a determination of the path loss for any transmission between a base station and a mobile unit which as been received at the location. This path loss value, the received pilot signal strength from each discernible base station, and the total received strength of all signals at the location are recorded for each location in the system 32. For this purpose, a received pilot signal strength lower than some cutoff level is considered to be non-discernible by the mobile unit.

Figure 4:
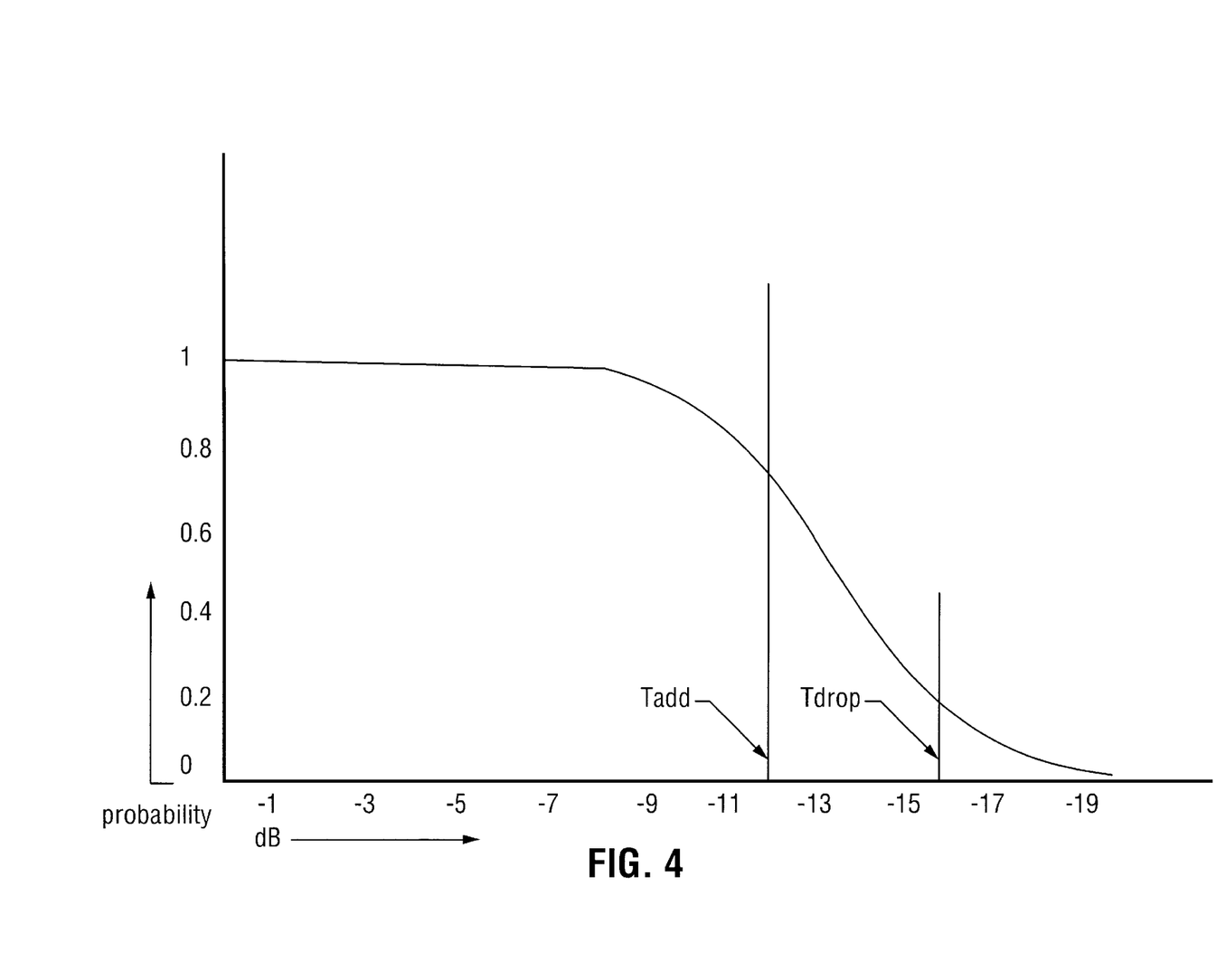
FIG. 4 is a probability curve used to evaluate the likelihood of a base station providing a received signal having a particular ratio of signal-to-interference level serving a particular location in a CDMA cellular telephone system.

In order to determine which base stations may be serving a location 34 (be on the active list), a probabilistic test is applied in accordance with the present invention in the manner illustrated in FIG. 6. Utilizing a probability curve such as that shown in FIG. 4 (derived data for the system) which evaluates the likelihood of a base station providing a received signal at particular location having a particular ratio of signal-to-interference level (Ec/Io), the probability of each individual base station serving the location may be determine. For any location, the Ec/Io ratio may be determined with respect to each base station by dividing the strength of the pilot signal received before decoding by the total received signal strength (total interference) at the location 42. It has been found that on an average pilot signals are received from two base stations at each location. Where more than one base station provides a discernible pilot signal at a location, the probability for each of the base stations individually is determined 46. Then, the probability for each possible group of those base stations from which discernible signals have been received may be obtained by multiplying the probabilities for each individual base station being received in the group by the probabilities of all others in the group and by the probabilities that all base stations not in the group will not be received 48. This is illustrated for a group of four base stations providing discernible pilot signals by the table in FIG. 5. This table shows at each of its intersections the probability for the particular group of base stations to serve the location.

Figure 5:
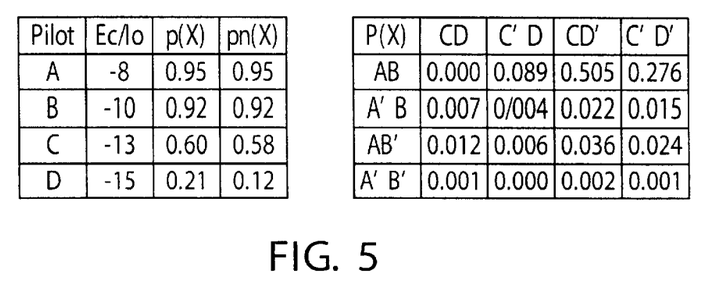
FIG. 5 is a diagram illustrating probabilities for receipt of signals from each possible group of base stations at a location within a CDMA cellular telephone system.

For example, in FIG. 5, the different pilot signals are assigned exemplary values with pilot A which is the strongest having a ratio (Ec/Io) of 8 dB below all interference while each of the other pilots is incrementally weaker and has a lower ratio. From the exemplary graph of FIG. 4, the probabilities (p(X)) for each of the individual base stations generating pilot signals A–D are determined and placed in the p(X) column of FIG. 5 for the row designating the particular pilot. These values are rationalized in the column labeled pn(X) for one embodiment of the invention to provide for the condition in which only three channels carrying voice signals may be received at once due to constraints of an actual network implementation. Then in the second portion of the figure, the values at the intersections of the rows and columns are the final probabilities for groups of pilots indicated at the beginning of each row and column. In the figure, an accent indicates that the particular pilot is absent.

From this, a list of possible base stations ranked in order of probability is obtained at each location considering any one of the base stations capable of serving that location. To determine the probability that any individual base station will serve an area of coverage defined by the outer limit 13 in FIG. 1 of a primary base station, the probability for each of the groups in which the primary base station and the other base station are included are summed. For example, in FIG. 5, the probability for each of the groups including the base stations A and B may be determined. This sum provides a number for the location. When all of the locations in the are of coverage are summed, a total probability number for each particular base station is realized. Thus, in determining a neighbor list for base station A, the probability of base station A serving that location with each of the other possible base stations (e.g., A and B, A and C, A and D) provides a list of neighbor stations based on the pure probability of each other possible base station serving the location together with base station A 50.

Once the base stations probably (or likely) serving a location are identified, the transmitted signal strength necessary to provide a quality signal is calculated for each of the identified base stations 36. Each base station is capable of adjusting the transmitted signal strength to maintain a quality signal with a mobile. The quality received signal level is determined by an Eb/No value which measures the energy per bit received at the location from the intended signals versus the total interference received, both measured after decoding. This calculation is repeated for each group of base stations with a significant probability of serving a location. In determining the transmit power necessary to produce a quality signal, an average transmit power may be computed by weighting the received signal strength by the probability that a signal will be received at the location from the base station. If then, the transmit power determined for each location throughout the system is summed for the base station, a total transmit power will be determined.

The process (shown in FIG. 6) of computing base stations, probabilities of serving a location, and required transmitter power of each base station continues for each location in the system (or portion of the system) for which the modeling is being done until values are determined for all positions. When a first round of computations has been completed, the new values determined during the first round for each received signal strength necessary to provide a quality signal at a location and each transmit strength required at a base station providing such a quality signal at the location are utilized in a second round of computations. That is, the increases in the values of received signals at the locations and the signals transmitted from the base stations are utilized to determine at each location a new total received signal value. An increase in total received signal value may be determined for each location by adding the incremental increases in individual received signal values to the total values previously computed.

The new total received signal strength at each location is used with the received signal strength of individual pilot signals to calculate Ec/Io and determine new probabilities of serving the location in the manner discussed above. Then the probability for each possible group of base stations is computed in the manner described. Finally, new transmitted signal strengths from each individual base station necessary to provide a quality signal at the location are computed by determining received signal strength to provide the required mobile Eb/No at the location. It is probable that for many locations, transmission strength for certain base stations must be increased again because the increase in transmission strength required by the first round computations raises the total received signal strength at most locations thereby requiring that the received signal strength from many base stations be increased to maintain the Eb/No required for quality service.

At some point in the modeling process, the increase in the level of signal strength transmitted by all of the base stations and the increase in interference level at each location in the system will equalize so that additional rounds of computation will have little real effect on the interference in the system. To determine when this occurs, a test is conducted when any round of computations for all of the locations has been completed to determine the change in total transmitted signal strength since the beginning of the round of computations 38. If the level is less than a predetermined level selected for the particular system to determine when the change has become too small to matter, the modeling is considered to be complete. This is sometimes called convergence in this specification 40. The values determined for each of the necessary transmission powers, the base stations defined by those powers, and the most probable of base station or groups of base stations to serve any location in the system are those determined on the last round of computations before the equalization test is met.

With these values for each location throughout a CDMA system modeled, a neighbor list may be prepared for each sector. Using the data accumulated for each location to determine the probabilities of different base stations serving the location, the probability of any base station having a particular area of coverage and any other particular base station both serving a location within that area of coverage may be found at each location throughout the system.

This is accomplished by determining the probability for each possible group of base stations of all the base stations capable of serving a location within the area of coverage which group includes the base station having the area of coverage and the other base station of interest. The probability for each group is the product of the probability of each base station in the group serving the location multiplied by the probability that each base station not in the group which might serve will not serve the location. These are the probabilities shown in the right hand portion of the table in the example of FIG. 5. The probabilities of each group including the two base stations are then summed to provide the probability that the two base stations will serve the location. Then, the probabilities of that base station and the other particular base station both serving locations in the area of coverage of the primary base station are summed for all locations in the area of coverage. Similarly, the probability of each of these pair groupings for any base station and each other base station which serves any particular location may be determined and summed throughout the system to produce for each area of coverage by a base station a list of probabilities for the base station and any other base station capable of serving the area of coverage. The result are numbers that sum the probabilities of the base station and each other base serving any location which the base station serves.

Selecting a list beginning with the highest sum of probabilities and moving toward incrementally lower sums of probabilities until a sufficient number of neighboring base stations have been selected for the capabilities of the system will provide a neighbor list which for each base stations includes only those other base stations most likely to actually provide service at each location served.

Once the process has iterated a sufficient number of times to generate a neighbor list for each location in the system, the process moves to utilize the same original data to determine the transmitter power required at each of the locations throughout the system. This is accomplished in essentially the same manner as the transmitter power for base stations is computed. That is, a base level total interference in the absence of received signal at each base station is used to determine the level of a decoded transmission necessary to provide a quality signal at the base station. This value added to the path loss to any location gives the mobile unit transmission strength necessary at the location. Moreover, the received signal strength necessary at any base station from each location multiplied by the probability (previously determined) that the base station will serve the location provides a new received signal level at each base station from each location. Summing these values provides an increased interference level at each base station. This requires the computation of a new increased received signal strength for a quality signal. It is probable that for many locations, transmission strength will have increased again because of the increase in received strength required at the base station during the round of computations. Consequently, it may be necessary to continue the round of computations for the determination of mobile transmission strength at locations. The operation may be iterated a number of times until a constant interference level at each of the base stations (convergence) is approached (as with the previous operation for determining transmission strength of the forward channels). When this has been accomplished, all of the data necessary for an operator to determine the quality of service throughout the system and to make changes necessary to enhance that quality at any location in the system is available.

It will be noted that by measuring the interference level at the sectors until the change in interference level is below some minimum value, a very rapid and accurate convergence is obtained. This should be contrasted with prior art systems which provide little indication of when accurate values for the system are available.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A process for modeling a CDMA cellular telephone system comprising the steps of:

determining base stations likely to communicate with a mobile unit at each of a plurality of closely spaced locations defining all positions of some area of a CDMA system at which a mobile unit is likely to communicate with base stations utilizing data indicating received signal level at each location and associated transmit power of each base station throughout the area;

determining the transmit power necessary for each base station to communicate effectively with a mobile unit at each location throughout the area;

calculating interference levels at each base station by determining a level of decoded transmission necessary to provide a quality signal at each base station, multiplying the level of decoded transmission determined for each location by a probability of a base station serving the location, and summing results determined from the multiplications;

repeating the forgoing steps of the process until transmit power for each base station does not change significantly from a preceding iteration of the process; then determining transmit power necessary for a mobile unit at each location to communicate with each base station which most probably communicates with a mobile unit at that particular location; and repeating the steps of the process for determining transmit power for each mobile unit until a total interference level at each base station does not change significantly from a preceding iteration of the process.

2. A computer implemented system for modeling characteristics of a cellular telephone system, comprising:

means for utilizing data gathered at closely-spaced locations throughout an area of the cellular telephone system being modeled to determine a base station most likely to serve each location and neighbor list of base stations for each base station most likely to serve each location;

means for utilizing data gathered at closely-spaced locations throughout an area of the cellular telephone system being modeled to determine rapidly transmit power required by a mobile unit at each location to communicate with each base station likely to serve such location, which comprises:

means for determining a transmit power using a total base level received signal power at all locations with which a base station is likely to serve;

means for determining a transmit power using total received signal power at all locations with which a base station is likely to serve to produce quality received signals from all locations with which a base station is likely to serve which comprises means for determining a received signal level sufficient to provide a quality signal at a location for a total base level received signal and means for determining a transmit power at a base station to produce the quality signal at a location; and means for redetermining a transmit power using total received signal power to produce quality received signals at all locations with which a base station is likely to serve until a difference between sequential transmit powers becomes insignificant; and means for utilizing data gathered at closely-spaced locations throughout an area of the cellular telephone system being modeled to determine rapidly transmit power required by a mobile unit at each location to communicate with each base station likely to serve such location.

* * * * *